(12) United States Patent
Shirko et al.

(10) Patent No.: US 12,013,528 B1
(45) Date of Patent: Jun. 18, 2024

(54) OPTIMISED TRACKING CAMERA POSITIONING IN DISPLAY DEVICES

(71) Applicant: Varjo Technologies Oy, Helsinki (FI)

(72) Inventors: Evgeny Shirko, Helsinki (FI); Juahn Cho, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/357,567

(22) Filed: Jul. 24, 2023

(51) Int. Cl.
  *G02B 27/00* (2006.01)
  *G02B 27/01* (2006.01)
  *G06T 17/20* (2006.01)

(52) U.S. Cl.
  CPC ..... *G02B 27/0093* (2013.01); *G02B 27/0172* (2013.01); *G06T 17/20* (2013.01); *G02B 2027/0138* (2013.01)

(58) Field of Classification Search
  CPC .. G06T 17/20; G02B 27/0172; G02B 27/0093

USPC .......................................................... 345/156
  See application file for complete search history.

(56) References Cited

U.S. PATENT DOCUMENTS

| | | | |
|---|---|---|---|
| 2018/0307310 A1* | 10/2018 | McCombe | G06F 3/04815 |
| 2020/0155931 A1* | 5/2020 | Luisi | G06T 7/73 |
| 2023/0306637 A1* | 9/2023 | Zhang | G06N 3/09 |

* cited by examiner

*Primary Examiner* — Calvin C Ma
(74) *Attorney, Agent, or Firm* — Ziegler IP Law Group (57) ABSTRACT

A tracking system for use in a display device that has an eye piece per eye. The tracking system includes a plurality of illuminators per eye, arranged along a periphery of the eye piece; and a first camera per eye, arranged at the periphery of the eye piece. A line passing through the first camera and an optical centre of the eye piece forms a first angle lying in a range of 0 degree to 40 degrees with respect to a horizon plane, wherein an optical axis of the eye piece and an inter-optical horizon line lie on the horizon plane, the inter-optical horizon line passing through optical centres of both eye pieces of the display device. The first camera is positioned below the horizon plane.

11 Claims, 7 Drawing Sheets

OPTIMISED TRACKING CAMERA POSITIONING IN DISPLAY DEVICES

TECHNICAL FIELD

The present disclosure relates to tracking systems for use in display devices, the tracking systems incorporating optimised tracking camera positioning. The present disclosure also relates to display devices incorporating such tracking systems.

BACKGROUND

A head-mounted display (HMD) typically employs an eye-tracking system to detect and/or follow the user's eyes. Such an eye-tracking system determines a position of pupils of the user's eyes, and monitors a change in the position of the pupils. Generally, in the eye-tracking system, multiple illuminators are employed for emitting light towards the user's eyes, and multiple cameras are employed for capturing images depicting the user's eyes and reflections of the emitted light off the user's eyes. Thereafter, the reflections of the emitted light are used as reference for determining the position of the pupils in order to track the user's eyes.

Figure 1:
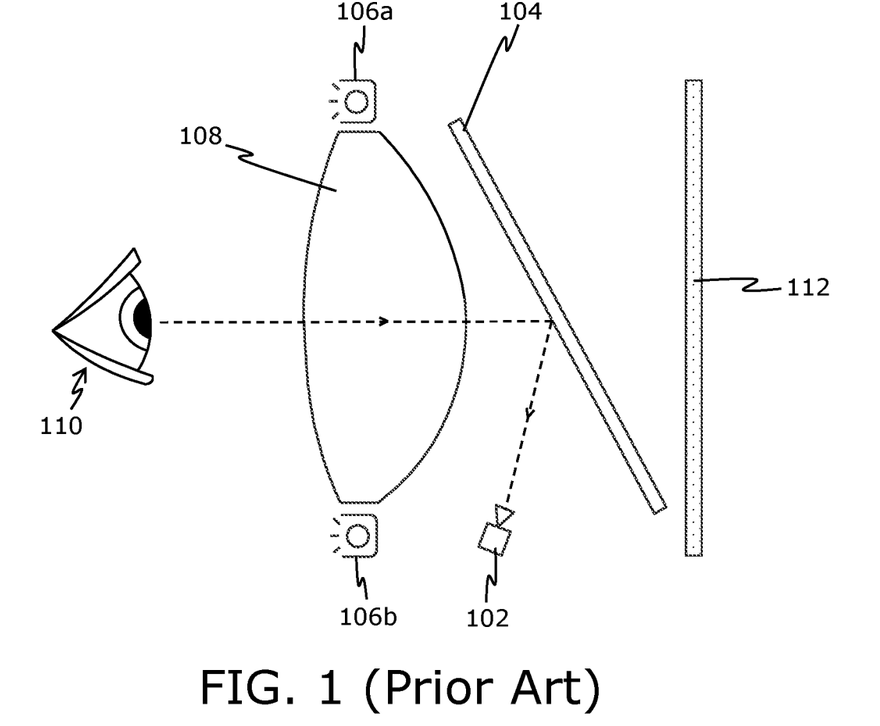
FIG. 1 (Prior Art) illustrates a schematic representation of a traditional eye-tracking system.

Referring to FIG. 1 (that represents Prior Art), illustrated is a schematic illustration of a traditional eye-tracking system. The traditional eye-tracking system comprises one or more cameras (depicted as a camera 102) and an array of illuminators 106a-b. When implemented in a display device (for example, an HMD), an arrangement of various components of the eye-tracking system is such that the array of illuminators 106a-b are arranged on a periphery of an eye piece lens 108 to face the user's eye, while the camera 102 is arranged on the other side of the eye piece lens 108. A hot mirror 104 is arranged between the eye piece lens 108 and a display 112 of the HMD, such that the camera 102 captures images of the user's eye through the hot mirror 104. In such a configuration, light reflecting off the user's eye passes through the eye piece lens 108 and gets reflected by the hot mirror 104 towards the camera 102. The captured images are then processed for estimating locations of a pupil of the user's eye 110 relative to the reflections of the illuminators 106a-b. Said configuration is based on an assumption that a distance between the eye piece lens 108 and the display 112 is always sufficient to locate the hot mirror 104 in between them, at an angle lying in a range of 40-70 degrees with respect to a display surface of the display 112. However, this may not always be possible. Moreover, due to this, an overall size of the display device is significantly increased. In terms of a trend for making HMDs more compact, reducing the size of the optical chamber is key, because a distance between the eye piece lens 108 and the display 112 is the biggest parameter affecting on overall size of the entire HMD. Moreover, advanced optics are being introduced to reduce the distance between the eye piece lens 108 and the display 112 to a point where it is impossible to locate the hot mirror 104 at a specific angle and locate the camera 102 outside the user's field of view when the user looks through the eye piece lens 108.

Furthermore, if the hot mirror 104 is not arranged to cover a complete field of view of the eye piece lens 108, defects such as image uniformity deviation and image distortions are introduced in captured images, due to glass edges of the hot mirror 104. If the edge of the hot mirror 104 is visible to the user through the eye pieces lens 108, color variation would also be visible due to infrared-reflective coatings on the hot mirror 104.

Moreover, as the camera 102 looks through the eye piece lens 108 to see the user's eye, and the eye piece lens 108 typically has a specific shape to create area to accommodate the user's nose, a field of view of the camera 102 gets obstructed. This factor is crucial in an eye-tracking system with an automatic inter-pupillary distance (IPD) adjustment. For some pupil positions, a nose area obstruction can block the field of view of the camera 102, which may lead to inaccurate eye tracking. Also, the eye-tracking system may suffer from optical distortions generated due to the eye piece lens 108.

Figure 2:
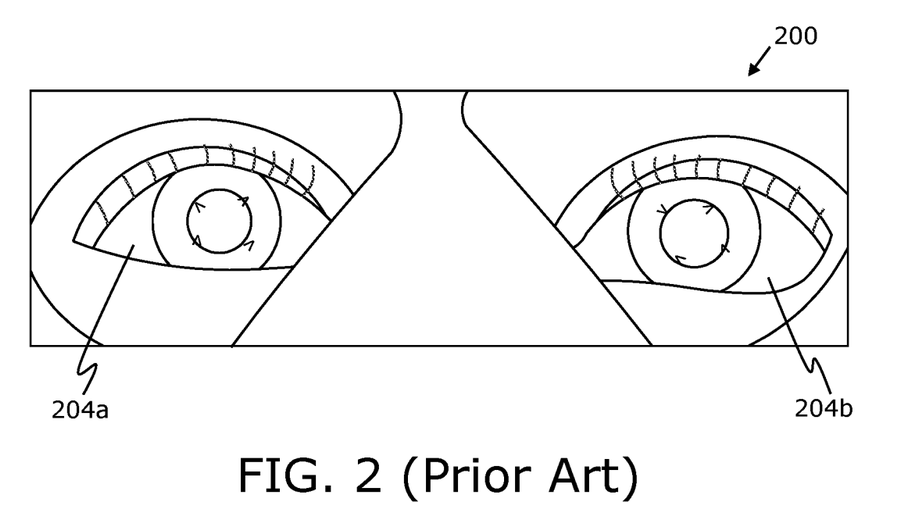
FIG. 2 (Prior Art) illustrates a schematic representation of an exemplary eye image of a user's eyes and reflections of illuminators from the user's eyes.

Referring to FIG. 2 (that represents Prior Art), illustrated is a schematic illustration of an exemplary eye image 200 of a user's eyes 204a and 204b and reflections of light emitted by illuminators from the user's eyes 204a-b. The eye image 200 depicts a combined view generated from at least two images captured using at least two cameras of a traditional eye-tracking system. A nose area obstruction (that blocks the field of view of the cameras) is clearly visible in the eye image 200. As shown, a portion of trackable features (for example, such as the corners of the eyes) of the user's eyes 204a-b are obscured in the eye image 200 due to a suboptimal (namely, faulty) configuration of the traditional eye-tracking system.

Therefore, in light of the foregoing discussion, there exists a need to overcome the aforementioned drawbacks associated with existing eye-tracking systems.

SUMMARY

The present disclosure seeks to provide a tracking system for accurate and reliable eye tracking and a display device incorporating such a tracking system. The aim of the present disclosure is achieved by a tracking system and a display device which incorporate optimised tracking camera positioning, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 5A illustrates a front view representing optimised positioning of cameras of a tracking system with respect to a horizon plane, while

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a tracking system for use in a display device, the display device comprising an eye piece per eye, the tracking system comprising:
 a plurality of illuminators per eye, arranged along a periphery of the eye piece; and
 a first camera per eye, arranged at the periphery of the eye piece, wherein a line passing through the first camera and an optical centre of the eye piece forms a first angle lying in a range of 0 degree to 40 degrees with respect to a horizon plane, wherein an optical axis of the eye piece and an inter-optical horizon line lie on the horizon plane, the inter-optical horizon line passing through optical centres of both eye pieces of the display device, the first camera being positioned below the horizon plane.

In a second aspect, an embodiment of the present disclosure provides a display device comprising a tracking system of the first aspect.

The tracking system utilises the first camera for capturing eye images of a user's eye, in order to track a gaze of the user's eye. When the first camera is arranged on the periphery of the eye piece according to a synergistic combination of the aforesaid position below the horizon plane and at the first angle lying in the range of 0 degree to 40 degrees, a field of view of the first camera is minimally obstructed or not obstructed at all, for example, due to eye lashes and/or epicanthic folds of the user's eye. As a result, a visibility of features of the user's eye (for example, such as a pupil, corners, etc.) is significantly improved, as compared to when the first camera would have been arranged at any other combination of position and angle. Thus, such an optimised positioning of the first camera enables in capturing eye images that are highly accurate, for example, in terms of accurately (namely, clearly) representing the features of the user's eye as well as the reflections of the plurality of illuminators (in form of inliers or glints). Moreover, when the user's eye is illuminated by the plurality of illuminators, the first camera being positioned according to the first angle is capable of capturing eye images that represent higher number of inliers, as compared to when the first camera would have been arranged at any other position and angle. Resultantly, this subsequently facilitates in tracking the user's eye with higher accuracy and precision, as greater the number of inliers per eye image, greater is the accuracy of eye tracking, and vice versa. Another notable technical benefit of arranging the first camera at the synergistic combination of the aforesaid position and the first angle is that reflections of illuminators (namely, glints) from eyeglasses of the user are reflected away, as compared to when the first camera is arranged on or in a proximity of the optical axis of the eye piece. This further improves the accuracy of eye tracking.

Moreover, due to its stable and compact configuration, the tracking system can be easily used in various types of display devices without obstructing the user's view. As the tracking system does not need to utilise a hot mirror like in the prior art, there are fewer reflections between optical elements in the tracking system. Resultantly, eye images captured using the first camera do not compromise on brightness, contrast and colour accuracy. Additionally, this potentially facilitates in manufacturing display devices in compact sizes with lower costs and complexity. Thus, the tracking system is suitable to be implemented in even display devices having a limited space inside the optical chamber (for example, in case of pancake optics).

Furthermore, as the first camera is arranged at the periphery of the eye piece (along with the illuminators) facing the user, it is possible to use wide-angle camera lenses in the first camera. This enables capturing images of other parts of the user's face (for example, such as eyebrows and creases around the eyes); this, in turn, facilitates face mimics tracking simultaneously with gaze tracking. Moreover, in implementations where no eye piece lens is implemented inside the eye piece, there are no optical distortions arising from the eye piece lens. Furthermore, a radius of a cornea of the user's eye is not required to be calibrated with stereo camera setup (in order to find a position of the centre of the cornea), unlike a mono camera setup of the prior art. In other words, the positions and radii of the centres of both the corneas are optimized due to the arrangement of the first camera according to the synergistic combination of position and angle. As a result, the initial calibration process can be made simple. Overall, the tracking system is simple in construction, reliable and can be implemented with ease.

Throughout the present disclosure, the term "display device" refers to specialized equipment that is capable of at least displaying images. Optionally, the display device is implemented as a head-mounted display (HMD) device. Herein, the term "head-mounted display device" refers to specialized equipment that is configured to present an extended-reality (XR) environment to a user, when said HMD device, in operation, is worn by the user on his/her head. The HMD device is implemented, for example, such as an XR headset, a pair of XR glasses, and the like, that is operable to display a visual scene of the XR environment to the user. The term "extended-reality" encompasses virtual reality (VR), augmented reality (AR), mixed reality (MR), and the like.

Throughout the present disclosure, the term "eye piece" refers to an element through which light emanating from a given light source of the display device travels and incidents towards a user's eye, when the display device is worn by the user. The eye piece can be understood to be an element that is closest to the user's eye, when the display device is worn by the user. It will be appreciated that the plurality of illuminators and a given camera are arranged at the periphery of the eye piece in a manner that the plurality of illuminators and the given camera physically surround the periphery of the eye piece. It will also be appreciated that the periphery of the eye piece may or may not surround an eye piece lens. In other words, the eye piece can be implemented with or without an eye piece lens. In some implementations, when the periphery of the eye piece surrounds an eye piece lens, the eye piece lens is said to be arranged on an optical path between the given light source of the display device and the user's eye. In such a case, the aforesaid light travels through the eye piece lens towards the user's eye. Thus, the eye piece can be understood to be an element through which light emanating from the given light source exits towards the user's eye, irrespective of whether the eye piece lens is implemented or not. The term "given camera" encompasses at least the first camera.

The term "eye piece lens" refers to an optical element that is accommodated within the periphery of the eye piece. It will be appreciated that the eye piece lens is capable of directing a projection of the visual scene towards the user's eye, when the display device is worn by the user. Optionally, the eye piece lens is implemented as at least one of: a convex lens, a plano-convex lens, a Liquid Crystal (LC) lens, a liquid lens, a Fresnel lens, an aspherical lens, an achromatic lens, a polymeric lens, a freeform lens, a polariser, a mirror, a semi-transparent mirror, a polarising mirror, a diffractive optical element. Further, the term "light source" refers to an element from which light emanates. Optionally, the given light source is implemented as a display or a projector. Displays and projectors are well-known in the art.

Throughout the present disclosure, the term "tracking system" refers to specialized equipment that is capable of detecting and/or following at least the user's eyes. The tracking system is used in the display device to track the user's eyes via non-invasive techniques. It will be appreciated that the tracking system could be arranged in the display device in a manner that it does not cause any obstruction in the user's view. It will also be appreciated that tracking of the user's eyes not only facilitates in determining a gaze direction of the user's eye, but may also facilitate in detecting a facial expression of the user, a shape of the user's eyebrow, and the like (as discussed later).

Throughout the present disclosure, the term "illuminator" refers to an element that, in operation, emits light. Examples of a given illuminator include, but are not limited to, a light-emitting diode (LED), a projector, a display, a laser. Optionally, the plurality of illuminators emit light of an infrared (IR) wavelength or a near-IR wavelength. The emitted light of the IR wavelength or the near-IR wavelength is invisible (or imperceptible) to the human eye, thereby, reducing unwanted distraction when such light is incident upon the user's eye. Alternatively, optionally, the plurality of illuminators emit light of a visible wavelength. Yet alternatively, optionally, the plurality of illuminators emit light of an ultraviolet (UV) wavelength. In this regard, the UV wavelength could be selected from a range of wavelengths which are not harmful to the human eye. For example, the UV wavelength may lie in a range from 315 nanometres to 400 nanometres.

It will be appreciated that the plurality of illuminators are arranged along the periphery of the eye piece in a manner that the plurality of illuminators face the user's eye, when the display device, in operation, is worn by the user on his/her head. In this regard, a given illuminator may be controlled (optionally, by at least one processor of the tracking system) to emit light towards the user's eye to illuminate the user's eye. During illumination of the user's eye by the given illuminator, light emitted by the given illuminator is reflected from a surface of the user's eye. The given illuminator may be switched on to be illuminated, for example, using a control signal that is generated by the at least one processor.

Throughout the present disclosure, the term "camera" refers to an equipment that is operable to detect and process the light reflected from a surface of the user's eye, so as to capture eye images of the user's eye and reflections of the plurality of illuminators (during the illumination of such illuminators) from the user's eye. It will be appreciated that the given camera is arranged on the periphery of the eye piece in a manner that the given camera faces the user's eye, when the display device, in operation, is worn by the user on his/her head. It is to be understood that the term "eye image" refers to a captured image of the user's eye. Optionally, the given camera is implemented as any one of: an image capturing camera, an event camera, a laser camera, a light field camera. Optionally, the image capturing camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the image capturing camera is implemented as a depth camera. Examples of the depth camera include, but are limited to, a Time-of-Flight (ToF) camera, a light detection and ranging (LiDAR) camera, a Red-Green-Blue-Depth (RGB-D) camera, a stereo camera, a plenoptic camera, an IR camera, a ranging camera, a Sound Navigation and Ranging (SONAR) camera. In some implementations, when the plurality of illuminators emit light of the IR wavelength, the IR camera or a hyperspectral camera may be utilized for imaging. In other implementations, when the plurality of illuminators emit light of the visible wavelength, the visible-light camera or the hyperspectral camera may be utilized for the imaging.

Notably, the first camera is positioned below the horizon plane at the first angle that lies in the range of 0 degree to 40 degrees with respect to the horizon plane. In an example, the first angle may be from 0, 5, 10, 20 or 30 degrees up to 15, 25 or 40 degrees. Throughout the present disclosure, the term "horizon plane" refers to an imaginary plane which passes through the optical axis of the eye piece and the inter-optical horizon line. The optical axis of the eye piece and the inter-optical horizon line are perpendicular to each other. The horizon plane serves as a basis for arranging the given camera at the periphery of the eye piece.

As mentioned earlier, when the first camera is arranged on the periphery of the eye piece according to the synergistic combination of the aforesaid position below the horizon plane and at the first angle, a field of view of the first camera would be minimally obstructed or not obstructed at all, for example, due to the eye lashes and/or the epicanthic folds of the user's eye; thus, the visibility of the features of the user's eye would be significantly improved, as compared to when the first camera would have been arranged at any other combination of position and angle. In this way, the optimised positioning of the first camera enables in capturing the eye images that are highly accurate, for example, in terms of accurately (namely, clearly) representing the features of the user's eye as well as the reflections of the plurality of illuminators (namely, inliers or glints). Moreover, when the user's eye is illuminated by the plurality of illuminators, the first camera being positioned according to the first angle would be capable of capturing images representing higher number of inliers, as compared to when the first camera would have been arranged at any other position and angle. Resultantly, this subsequently facilitates in tracking the user's eye with high accuracy and precision, as greater the number of inliers per eye image, greater is the accuracy of eye tracking, and vice versa. Throughout the present disclosure, the term "inlier" refers to a glint or a reflection of an illuminator from within a cornea of the user's eyes; such a glint has an almost perfect reflection from the cornea's smooth surface, enabling estimation of the pupil's position and direction with high accuracy. On the other hand, the term "outliers" refers to a reflection of an illuminator from outside the cornea of the user's eye.

Experiments conducted by the inventors (explained in greater detail later in the Experimental Part section) have enabled to further refine the first angle based on whether the first camera is positioned at a portion of the periphery of the eye piece that lies in a proximity of the user's nose (when the display device is worn by the user) or at another portion of the periphery that lies horizontally opposite to said portion of the periphery.

In an embodiment, the first camera is arranged at the portion of the periphery of the eye piece that lies in the proximity of the user's nose when the display device is worn by the user, wherein the first angle lies in a range of 20 degrees to 40 degrees with respect to the horizon plane. More optionally, the first angle lies in a range of 24 degrees to 40 degrees with respect to the horizon plane. In this regard, the first camera would be closer to the user's nose when the display device is worn by the user. In an example, the first angle may be from 20, 22, 25 or 30 degrees up to 30, 35 or 40 degrees with respect to the horizon plane. Hereinafter, the phrase "a portion of the periphery of the eye piece that lies in a proximity of a user's nose" is referred to as "nose portion", for sake of simplicity and convenience only.

In another embodiment, the first camera is arranged at the another portion of the periphery of the eye piece, the another portion lying horizontally opposite to said portion of the periphery that lies in the proximity of the user's nose when the display device is worn by the user, wherein the first angle lies in a range of 0 degree to 30 degrees with respect to the horizon plane. More optionally, the first angle lies in a range of 6 degrees to 25 degrees with respect to the horizon plane. In this regard, the first camera would be far away from the user's nose, and would be located on a side horizontally opposite to the user's nose, when the display device is worn by the user. In an example, the first angle may be from 0, 5, 10, 15 or 25 degrees up to 10, 20 or 30 degrees with respect to the horizon plane. The phrase "horizontally opposite" means that when viewed from a perspective of the user, said portion of the periphery and the another portion of the periphery appear to be horizontally opposite to each other. Hereinafter, the phrase "the another portion of the periphery of the eye piece, the another portion lying horizontally opposite to said portion of the periphery that lies in the proximity of the user's nose" is referred to as "side portion", for sake of simplicity and convenience only.

Moreover, optionally, the first camera is arranged at a first portion of the periphery of the eye piece, the tracking system further comprising a second camera per eye, arranged at a second portion of the periphery of the eye piece, the second portion being horizontally opposite to the first portion. In this regard, the second camera is also employed for capturing the eye images, in addition to the first camera, wherein the first camera and the second camera are arranged at different portions of the periphery of the eye piece (i.e., at the first portion and the second portion, respectively). It will be appreciated that the first portion could be one of: the nose portion and the side portion, while the second portion could be another of: the nose portion and the side portion. This means, in one case, when the first camera is arranged at the nose portion, the second camera is arranged at the side portion. In another case, when the second camera is arranged at the nose portion, the first camera is arranged at the side portion.

Optionally, a line connecting the second camera and the optical centre of the eye piece forms a second angle lying in a range of 0 degree to 40 degrees with respect to the horizon plane, the second camera being positioned below the horizon plane. In this regard, the second camera is also arranged at the periphery of the eye piece according to the synergistic combination of the aforesaid position below the horizon plane and at the second angle. In an example, the second angle may be from 0, 5, 10, 20 or 30 degrees up to 15, 25 or 40 degrees.

A technical benefit of employing the second camera in addition to and horizontally opposite to the first camera is that the number of inliers are doubled. This improves the accuracy of gaze tracking significantly. As will be noted later in the Experimental Part section, employing two cameras, one at the nose portion and another at the side portion, fills each other's gaps in terms of visibility of inliers.

In an embodiment, the second camera is arranged at the nose portion, wherein the second angle lies in a range of 20 degrees to 40 degrees with respect to the horizon plane. More optionally, the second angle lies in a range of 24 degrees to 40 degrees with respect to the horizon plane.

In another embodiment, the second camera is arranged at the side portion, wherein the second angle lies in a range of 0 degree to 30 degrees with respect to the horizon plane. More optionally, the second angle lies in a range of 6 degrees to 25 degrees with respect to the horizon plane.

It will be appreciated that when the second camera is arranged on the periphery of the eye piece in the aforesaid manner, a field of view of the second camera would be minimally obstructed or not obstructed at all, and thus, a visibility of the features of the user's eye would be significantly improved. Thus, the eye images captured by the second camera would be highly accurate, for example, in terms of accurately representing the features of the user's eye as well as the reflections of the plurality of illuminators. Moreover, when the user's eye is illuminated by the plurality of illuminators, the second camera being positioned according to the synergistic combination of the aforesaid position and the second angle would be capable of capturing eye images representing higher number of inliers, as compared to when the second camera would have been arranged at any other position and angle. Thus, beneficially, when both the first camera and the second camera are arranged in the aforesaid manner, the first camera and the second camera would capture eye images from different perspectives at a given time instant. In this regard, some inliers (namely, reflections of some illuminators) that are poorly represented or not represented at all in an eye image captured by the first camera may be clearly represented in another eye image captured by the second camera, and vice versa. In this way, an accuracy of tracking of the user's eye is even more significantly improved.

Furthermore, optionally, the tracking system further comprises at least one processor configured to:
- control the plurality of illuminators to illuminate the user's eye;
- control the first camera and the second camera to capture at least one first eye image and at least one second eye image of the user's eye, respectively, during illumination of the plurality of illuminators; and
- process the at least one first eye image and the at least one second eye image, based on a pose of the first camera and a pose of the second camera, to generate a three-dimensional (3D) model of the user's eye.

In this regard, the at least one processor controls an overall operation of the tracking system. It will be appreciated that the at least one processor is communicably coupled to various components of the tracking system. Optionally, the at least one processor of the tracking system is implemented as a processor of the display device. Alternatively, optionally, the tracking system and the display device have separate processors.

The at least one processor is configured to control a given illuminator to emit light towards the user's eye. During illumination of the user's eye, the light emitted by the given illuminator is reflected from the surface of the user's eye. The at least one first eye image is captured from a perspective of the pose of the first camera, while the at least one second eye image is captured from a perspective of the pose of the second camera. It is to be understood that different first eye images and different second eye images are captured when the user's eye moves, i.e., when viewing directions of the user's eye change. It will be appreciated that a given eye image captured during the illumination of the plurality of illuminators represents reflections of at least one illuminator from an ocular surface of the user's eye.

The term "three-dimensional model" of the user's eye refers to a data structure that comprises comprehensive information pertaining to the user's eye. Such a comprehensive information is indicative of at least one of: a geometry (for example, such as a size and a shape) of the user's eye, a plurality of features of the user's eye. Optionally, the 3D model of the user's eye is in form of at least one of: a 3D polygonal mesh, a 3D point cloud, a 3D surface cloud, a voxel-based model, a 3D grid, a 3D hierarchical grid, a bounding volume hierarchy, an image-based 3D model. The 3D polygonal mesh could be a 3D triangular mesh or a 3D quadrilateral mesh. It is to be understood that the 3D model of the user's eye is generated prior to using the display device for a given XR session.

Optionally, the at least one processor is configured to utilize information pertaining to visual representation of the user's eye as captured in the at least one first eye image and the at least one second eye image from different perspectives of the pose of the first camera and the pose of the second camera when generating the 3D model of the user's eye. In other words, said information is accurately known to the at least one processor, in great detail from various perspectives of the first camera and the second camera. Beneficially, the 3D model of the user's eye generated by utilising said poses is accurate (for example, in terms of detecting a gaze direction of the user's eye) and is information-rich (i.e., comprehensive). The term "pose" encompasses a position and/or an orientation. It will be appreciated that the poses of the first camera and the second camera are typically fixed (and thus already known), because the first camera and the second camera are typically mounted at fixed positions and orientations.

Optionally, when processing the at least one first eye image and the at least one second eye image to generate the 3D model of the user's eye, the at least one server is configured to employ at least one data processing algorithm. Optionally, in this regard, the at least one data processing algorithm is at least one of: a feature extraction algorithm, an image stitching algorithm, an image merging algorithm, an interpolation algorithm, a 3D modelling algorithm, a photogrammetry algorithm, an image layering algorithm, an image blending algorithm. Such data processing algorithms are well-known in the art. Optionally, upon generating the 3D model, the at least one processor is configured to store the 3D model at a data repository. Since different users would have different eye geometries, different 3D models can be generated for the different users, and be stored at the data repository. It will be appreciated that the data repository could, for example, be implemented as a memory of the at least one processor, a removable memory, a cloud-based database, or similar.

Optionally, the at least one processor is configured to utilise the 3D model of the user's eye to detect a gaze direction of the user's eye. In this regard, since the 3D model of the user's eye comprises the comprehensive information pertaining to the user's eye, different gaze directions corresponding to different positions of pupil of the user's eye can be accurately detected. In such a case, the at least one processor can easily and accurately map features extracted from a captured eye image to the 3D model of the user's eye, in order to detect the gaze direction of the user's eye. Said features may be related to a position of the pupil relative to positions of the reflections of the plurality of illuminators, a position of the pupil relative to positions of the corners of the user's eyes, and the like. Beneficially, the different 3D models facilitate in detecting accurate user-specific gaze directions. Moreover, an accurate tracking of the gaze direction facilitates the display device to closely implement gaze contingency when presenting an XR environment to the user. Utilising the 3D model of the user's eye to detect the gaze direction of the user's eye is well-known in the art.

It will be appreciated that the tracking system could alternatively employ a two-dimensional (2D) approach to detect the gaze direction of the user's eye. As an example, the eye image can be compared with at least one reference image (that was captured during an initial calibration process) to determine the gaze direction of the user's eye. Such a 2D approach is well-known in the art. Notably, irrespective of whether a 2D approach or a 3D approach is utilised, the technical benefit of employing the second camera in addition to and horizontally opposite to the first camera is achieved. In other words, the accuracy of gaze tracking is improved significantly, irrespective of the 2D approach or the 3D approach.

Moreover, optionally, the tracking system further comprises at least one processor configured to:

control the plurality of illuminators to illuminate the user's eye; and control the first camera to capture at least one first eye image of the user's eye, during illumination of the plurality of illuminators.

In this regard, when the tracking system comprises only the first camera, the first camera is employed to capture the at least one first image of the user's eye, in a same manner as discussed earlier.

Optionally, the at least one processor is configured to process the at least one first eye image to detect at least one of: a gaze direction of the user's eye, a facial expression of the user, a shape of the user's eyebrow, a shape of wrinkles on the user's skin, whether the user's eyelid is open or closed, whether the user has worn the display device. Optionally, the at least one processor is configured to detect the gaze direction of the user's eye by determining a relative position of the pupil of the user's eye with respect to the reflections of the illuminators in the at least one first eye image. In this regard, the reflections of the illuminators act as a frame of reference against which the relative position of the pupil is calculated to determine the gaze direction of the user's eye. As the pupil of the user's eye is oriented along the gaze direction of the user's eye, the determined relative position of the pupil with respect to said reflections enables to correctly discern the gaze direction of the user's eye. It will be appreciated that the gaze direction of the user's eye is detected continuously while the user views images (for example, such as pertaining to an XR environment) displayed via the at least one light source, and the gaze direction of the user's eye is beneficially optionally utilized during generation of said images to be displayed at the at least one light source.

Optionally, the at least one processor is configured to detect the facial expression of the user by analysing the at least one first eye image using at least one computer vision technique. In this regard, key facial landmarks, for example, such as a position of the user's eye, eyebrows and nose may be tracked over a period of time, and the at least one processor can infer various facial expressions like happiness, sadness, anger, surprise, and the like, accordingly. This could be done by comparing detected facial landmarks with predefined patterns or using machine learning algorithms trained on a large dataset of labelled facial expressions.

Optionally, the at least one processor is configured to analyse the at least one first eye image to detect the user's eyebrows, by extracting features in the at least one first eye image. Such features may, for example, indicate a position, a curvature, or similar of the user's eyebrows. By comparing these features against predetermined thresholds or reference eye models, the shape of the user's eyebrows can be determined. For example, it can be detected whether the user's eyebrows are raised, furrowed, arched, or in a normal position.

Optionally, by analysing the at least one first eye image, the processor is configured to identify regions of the user's skin that exhibit characteristics associated with wrinkles and/or facial expressions. This could involve detecting variations/patterns in a texture, a colour, or a presence of lines and creases on the user's skin. The at least one processor may be configured to employ image processing algorithms, for example, such as an edge detection algorithm or a texture analysis, to detect said variations/patterns. Based on the detected variations/patterns, a shape and an extent of wrinkles and/or the facial expressions on the user's skin can be detected easily. It will be appreciated that changes in the shape of wrinkles may be used to determine, for example, whether the user is smiling or laughing.

Optionally, the at least one processor is configured to analyse a portion of the at least one first eye image that represents a region surrounding the user's eye to detect a state of the user's eyelid. In such a case, the at least one processor may detect at least one of: a contour of the user's eye, a presence of eyelashes of the user's eye, a relative position of an upper eyelid and a lower eyelid of the user's eye. Upon such detection, it can be accurately determined whether the user's eyelid is open, partially closed, or completely closed. It will be appreciated that the detection of whether the user's eyelid is open or closed need not be limited to a binary (namely, ON/OFF) state, but could rather be related to a floating value. In other words, instead of classifying a state of the user's eyelid as either fully open or fully closed, a continuous range of values to represent different degrees of openness or closure of the user's eyelid could be determined using the floating value. As an example, using a floating value representation would likely involve using techniques such as image analysis, machine learning, or computer vision algorithms to estimate a degree of eyelid openness, based on visual cues and features extracted from the at least one first eye image.

Optionally, in order to detect whether the user has worn the display device, the at least one processor is configured to analyse the first eye image for detecting presence of reflections or glares on the surface of the user's eye.

The present disclosure also relates to the display device as described above. Various embodiments and variants disclosed above, with respect to the aforementioned tracking system, apply mutatis mutandis to the display device.

Optionally, the display device further comprises:

at least one light source that is to be employed to display images to a user; and an eye piece lens through which light emanating from the at least one light source exits, wherein the periphery of the eye piece surrounds the eye piece lens.

Information pertaining to the at least one light source and the eye piece lens has already been discussed earlier in detail. Hereinabove, the term "image" refers to XR images that are to be displayed to the user of the display device, when the display device is worn by the user.

DETAILED DESCRIPTION OF THE DRAWINGS

Figure 3:
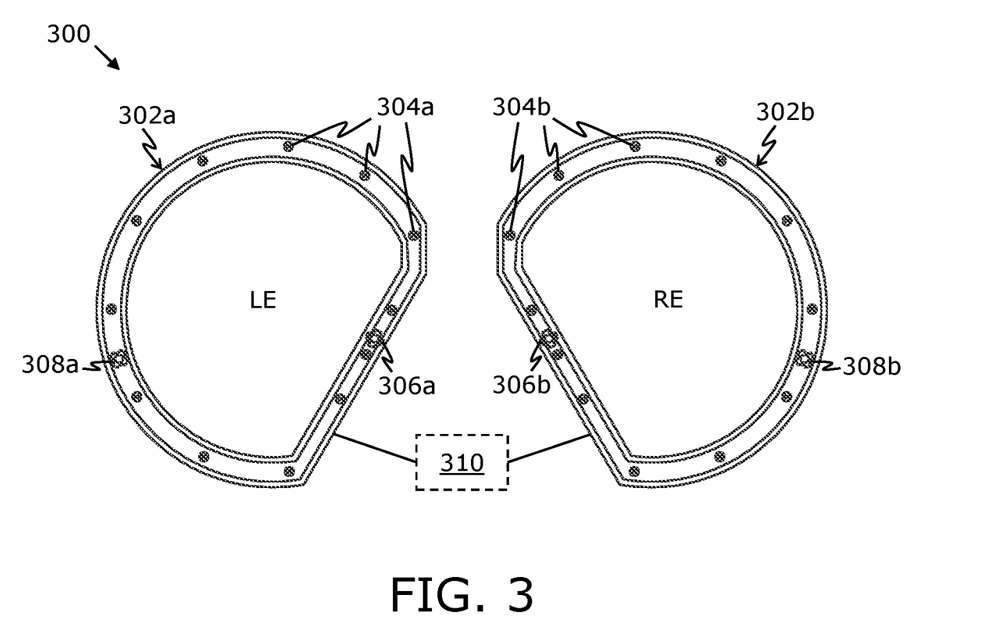
FIG. 3 is a schematic representation of a tracking system for use in a display device, the tracking system incorporating optimised tracking camera positioning, in accordance with an embodiment of the present disclosure.

Referring to FIG. 3, illustrated is a schematic representation of a tracking system 300 for use in a display device, the tracking system 300 incorporating optimised tracking camera positioning, in accordance with an embodiment of the present disclosure. The display device comprises an eye piece per eye, depicted as eye pieces 302a and 302b. The tracking system 300 comprises a plurality of illuminators per eye (for example, depicted as illuminators 304a for a first eye and illuminators 304b for a second eye) and a first camera per eye (for example, depicted as first cameras 306a and 306b for the first eye and the second eye, respectively). Optionally, the tracking system 300 further comprises a second camera per eye (for example, depicted as second cameras 308a and 308b for the first eye and the second eye, respectively), and at least one processor (for example, depicted as a processor 310). The processor 310 is communicably coupled to the illuminators 304a-b, the first cameras 306a-b, and the second cameras 308a-b.

It may be understood by a person skilled in the art that FIG. 3 includes a simplified architecture of the tracking system 300 for sake of clarity, which should not unduly limit the scope of the claims herein. It is to be understood that the specific implementation of the tracking system 300 is provided as an example, and is not to be construed as limiting it to specific numbers or types of illuminators, cameras, and processors. A person skilled in the art will recognize many variations, alternatives, and modifications of embodiments of the present disclosure.

Figure 4:
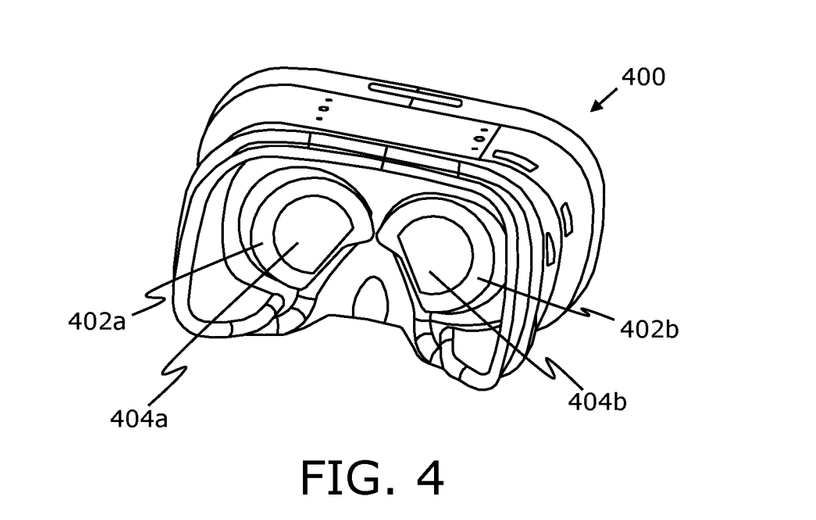
FIG. 4 is a schematic representation of a display device in which a tracking system is used, the tracking system incorporating optimised tracking camera positioning, in accordance with an embodiment of the present disclosure.

Referring to FIG. 4, illustrated is a schematic representation of a display device 400 in which a tracking system is used, the tracking system incorporating optimised tracking camera positioning, in accordance with an embodiment of the present disclosure. The display device 400 comprises the tracking system and an eye piece per eye (for example, depicted as eye pieces 402a and 402b for a first eye and a second eye, respectively). Optionally, the display device 400 further comprises at least one light source per eye (not shown) and an eye piece lens per eye (depicted as eye piece lens 404a and 404b for the first eye and the second eye, respectively).

It may be understood by a person skilled in the art that FIG. 4 includes a simplified architecture of the display device 400 for sake of clarity, which should not unduly limit the scope of the claims herein. It is to be understood that the specific implementation of the display device 400 is provided as an example. A person skilled in the art will recognize many variations, alternatives, and modifications of embodiments of the present disclosure.

Figure 5A:
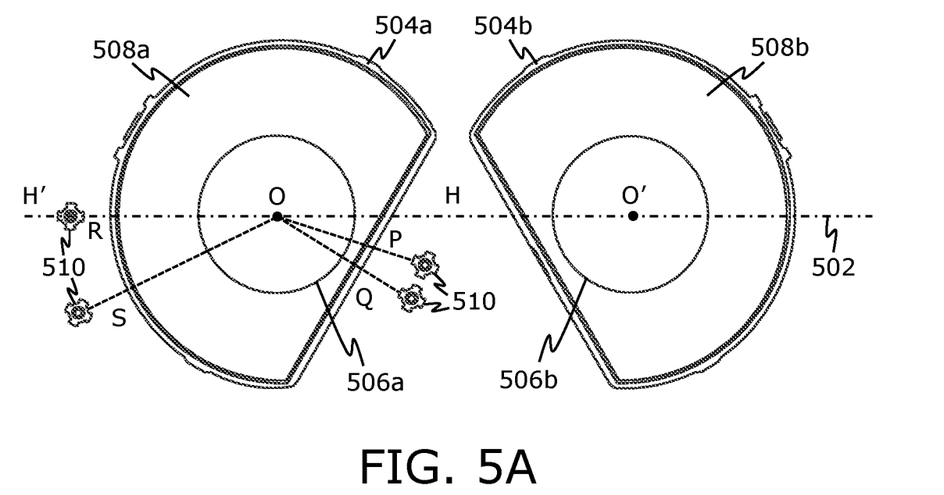
Figure 5B:
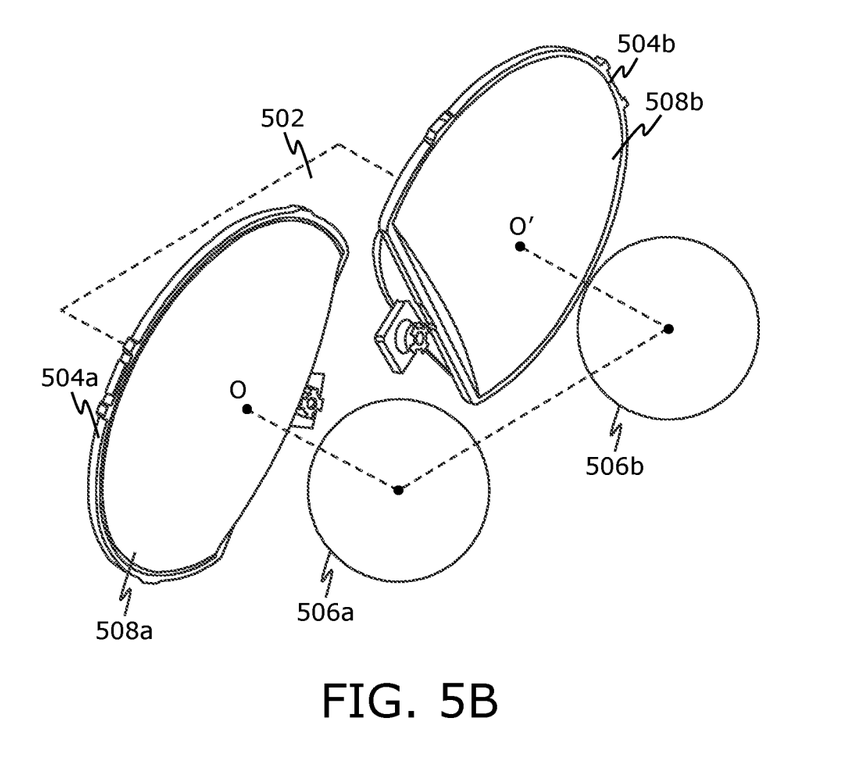
FIG. 5B illustrates a perspective view representing relative positions of eye pieces of a display device with respect to user's eyes, in accordance with an embodiment of the present disclosure.

Referring to FIGS. 5A and 5B, FIG. 5A illustrates a front view representing optimised positioning of cameras of a tracking system with respect to a horizon plane 502, while FIG. 5B illustrates a perspective view representing relative positions of eye pieces 504a and 504b of a display device (not shown) with respect to user's eyes, in accordance with an embodiment of the present disclosure. With reference to FIGS. 5A and 5B, the eye piece 504a corresponds to a first eye 506a of a user, while the eye piece 504b corresponds to a second eye 506b of the user. A periphery of the eye piece 504a accommodates an eye piece lens 508a, while a periphery of the eye piece 504b accommodates an eye piece lens 508b. The eye piece 504a has an optical centre O, while the eye piece 504b has an optical centre O'. An optical axis (which passes through the optical centre O) of the eye piece 504a, an optical axis (which passes through the optical centre O') of the eye piece 504b, and an inter-optical horizon line OO' lie on the horizon plane 502. The inter-optical horizon line OO' passes through both the optical centre O of the eye piece 504a and the optical centre O' of the eye piece 504b.

With reference to FIG. 5A, positioning of a given camera 510 is only shown for the eye piece 504a, for sake of simplicity and clarity. It will be appreciated that the given camera 510 can be arranged at the periphery of the eye piece 504a, wherein a line passing through the given camera 510 and the optical centre O of the eye piece 504a forms an angle lying in a range of 0 degree to 40 degrees with respect to the horizon plane 502, the given camera 510 being positioned below the horizon plane 502.

As shown, in some implementations, the given camera 510 could be arranged at a portion PQ of the periphery of the eye piece 504a that lies in a proximity of a user's nose (not shown) when the display device is worn by the user, and wherein a line passing through the given camera 510 and the optical centre O of the eye piece 504a forms an angle lying in a range of 20 degrees (depicted as an angle POH) to 40 degrees (depicted as an angle QOH) with respect to the horizon plane 502. As shown, in other implementations, the given camera 510 could be arranged at another portion RS of the periphery of the eye piece 504a, the another portion RS lying horizontally opposite to the portion PQ of the periphery of the eye piece 504a when the display device is worn by the user, and wherein a line passing through the given camera 510 and the optical centre O of the eye piece 504a forms an angle lying in a range of 0 degree (depicted as an angle ROH') to 30 degrees (depicted as an angle SOH') with respect to the horizon plane 502. It will be appreciated that the portion PQ of the periphery of the eye piece 504a that lies in the proximity of the user's nose can be understood to be a nose portion, whereas the another portion RS of the periphery of the eye piece 504a can be understood to be a side portion that is horizontally opposite to the nose portion. The term "given camera" encompasses a first camera and/or a second camera.

FIGS. 5A and 5B are merely examples, which should not unduly limit the scope of the claims herein. The person skilled in the art will recognize many variations, alternatives, and modifications of embodiments of the present disclosure.

EXPERIMENTAL PART

A test simulation on the aforementioned tracking system was performed for determining optimised tracking camera positioning. The test simulation was performed for two different portions of a periphery of an eyepiece, namely, a nose portion of the periphery of the eyepiece and a side portion of the periphery of the eyepiece. The nose portion is a portion of the periphery of the eye piece that lies in a proximity of a user's nose. The side portion is a portion that is horizontally opposite to the nose portion. The test simulation and its observations for the nose portion is discussed in conjunction with FIGS. 6A, 6B, 6C, 7, 8A and 8B. The test simulation and its observations for the side portion is discussed in conjunction with FIGS. 9A, 9B, 9C, 10, 11A and 11B.

While performing the test simulation, only one of two eye pieces (for example, an eye piece corresponding to a left eye of a user) is considered for experimentation, and optimised tracking camera positioning obtained for said eye piece is mirrored and applied to another of the two eye pieces. Moreover, it is assumed that a distance between an eye of the user and vertex (namely, a centre) of an eye piece lens (i.e., an eye relief) is approximately 15 millimetres. A field of view (FOV) of a given camera that is to be arranged on the periphery of the eye piece is assumed to be approximately 55 degrees. Said FOV has been selected for the test simulation because it has been found to not impact visibility of glints/inliers (namely, reflections of a plurality of illuminators arranged on the periphery of the eye piece). Moreover, a camera aspect ratio is assumed to be 1:1; however, it is irrelevant for inliers to outliers ratio as long as said FOV covers a full-eye visibility. The term "given camera" encompasses a first camera and/or a second camera.

Figure 6A:
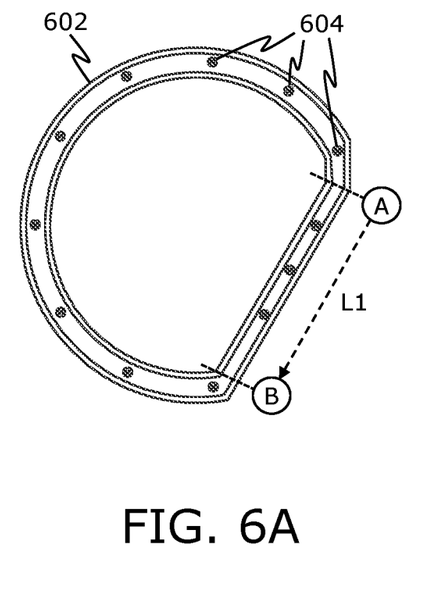
FIG. 6A illustrates an eye piece representing a portion of a periphery of the eye piece at which a given camera is arranged for performing a test simulation, in accordance with an embodiment of the present disclosure.

Referring to FIG. 6A, illustrated is an eye piece 602 representing a portion AB of a periphery of the eye piece 602 at which a given camera is arranged for performing a test simulation, in accordance with an embodiment of the present disclosure. The portion AB of the periphery lies in a proximity of a user's nose, in use. As shown, a plurality of illuminators 604 (depicted as 12 illuminators marked with crossed circles) are arranged along the periphery of the eye piece 602. For performing the simulation, a position of the given camera is gradually changed from A to B with a step size of 2 millimetres, and a number of inliers represented in a corresponding eye image are observed for different gaze directions of the user's eye. Assuming a local coordinate system having origin (0, 0) at a vertex of an eye piece lens, a positional coordinate for A is (24, 11) millimetres, and a positional coordinate for B is (2, −30) millimetres. Moreover, a distance L1 between A and B is equal to 46.5 millimetres.

It will be appreciated that making a tracking device with a smaller number of infrared LEDs decreases the cost of the end product (namely, the display device) and simplifies manufacturing. Therefore, in order to avoid counterargument of "increasing the number of LEDs to achieve a greater number of inliers", a spatial length of the periphery of the eye piece is considered for efficiency evaluation, instead of an actual value of visible glints.

Figure 6B:
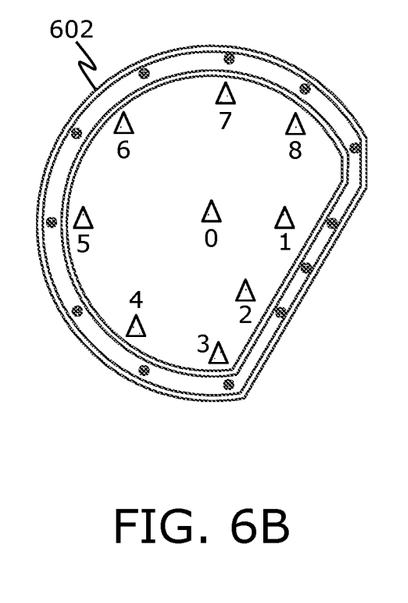
FIG. 6B illustrate different positions of areas/points on an imaginary plane through which different gaze directions of the user's eye pass, when a display device is worn by the user, in accordance with an embodiment of the present disclosure.

Referring to FIG. 6B, illustrated are different positions of areas/points on an imaginary plane (that is perpendicular to the horizon plane and on which the inter-optical horizon line lies) through which different gaze directions of the user's eye pass, when a display device is worn by the user, in accordance with an embodiment of the present disclosure. In other words, if an eye piece lens were placed at this imaginary plane, these different positions would indicate areas/points on the eye piece lens through which the user would look, when looking according to the different gaze directions of the user's eye. As shown, nine different positions of such areas/points are depicted using nine triangles marked from 0 to 8, wherein the nine different positions correspond to nine different gaze directions. For a given position of the given camera, eye images corresponding to the nine different gaze directions are analysed for determining the number of inliers represented in said eye images. Table 1 given hereinbelow represents the number of inliers for each position of the given camera and each gaze direction of the user's eye.

TABLE 1

| Gaze directions | | #0 | #1 | #2 | #3 | #4 | #5 | #6 | #7 | #8 | Average no. of inliers |
|---|---|---|---|---|---|---|---|---|---|---|---|
| Camera positions (mm) | 0 | 4 | 3 | 4 | 3 | 3 | 2 | 3 | 3 | 3 | 3.11 |
| | 2 | 4 | 3 | 4 | 3 | 3 | 2 | 3 | 4 | 4 | 3.33 |
| | 4 | 5 | 4 | 4 | 3 | 3 | 2 | 3 | 4 | 5 | 3.67 |
| | 6 | 5 | 4 | 4 | 3 | 2 | 2 | 3 | 4 | 6 | 3.67 |
| | 8 | 6 | 5 | 4 | 4 | 3 | 2 | 2 | 4 | 6 | 4.00 |
| | 10 | 6 | 6 | 6 | 5 | 3 | 2 | 2 | 4 | 6 | 4.44 |
| | 12 | 7 | 6 | 6 | 5 | 3 | 3 | 2 | 4 | 6 | 4.67 |
| | 14 | 8 | 8 | 6 | 6 | 3 | 3 | 2 | 4 | 6 | 5.11 |
| | 16 | 9 | 9 | 6 | 5 | 3 | 3 | 3 | 3 | 4 | 5.00 |
| | 18 | 10 | 9 | 6 | 6 | 2 | 3 | 3 | 4 | 5 | 5.33 |
| | 20 | 12 | 10 | 6 | 6 | 4 | 3 | 3 | 4 | 6 | 6.00 |
| | 22 | 12 | 10 | 7 | 7 | 4 | 4 | 4 | 4 | 6 | 6.44 |
| | 24 | 12 | 10 | 6 | 7 | 4 | 4 | 3 | 3 | 5 | 6.00 |

TABLE 1-continued

| Gaze directions | #0 | #1 | #2 | #3 | #4 | #5 | #6 | #7 | #8 | Average no. of inliers |
|---|---|---|---|---|---|---|---|---|---|---|
| 26 | 11 | 9 | 4 | 8 | 3 | 3 | 3 | 2 | 3 | 5.11 |
| 28 | 10 | 8 | 4 | 3 | 3 | 2 | 3 | 2 | 3 | 4.22 |
| 30 | 9 | 8 | 5 | 3 | 2 | 2 | 2 | 2 | 3 | 4.00 |
| 32 | 8 | 7 | 4 | 3 | 3 | 2 | 2 | 2 | 2 | 3.67 |
| 34 | 7 | 6 | 4 | 4 | 3 | 2 | 1 | 2 | 2 | 3.44 |
| 36 | 6 | 6 | 4 | 4 | 3 | 2 | 1 | 1 | 2 | 3.22 |
| 38 | 6 | 6 | 3 | 4 | 4 | 1 | 1 | 1 | 2 | 3.11 |
| 40 | 5 | 5 | 3 | 5 | 4 | 1 | 0 | 1 | 1 | 2.78 |
| 42 | 5 | 4 | 3 | 5 | 3 | 1 | 0 | 0 | 1 | 2.44 |
| 44 | 4 | 3 | 2 | 5 | 4 | 1 | 0 | 0 | 0 | 2.11 |
| 46 | 4 | 3 | 1 | 4 | 4 | 1 | 0 | 0 | 0 | 1.89 |

Figure 6C:
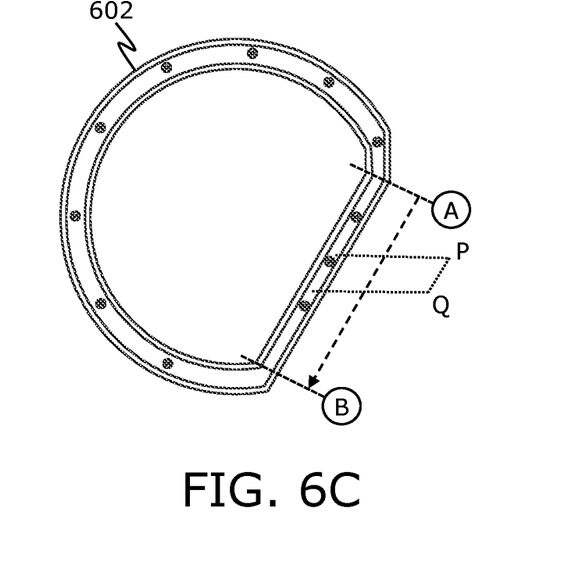
FIG. 6C illustrates a nose portion of a periphery of an eye piece for positioning a given camera, in accordance with an embodiment of the present disclosure.

Referring to FIG. 6C, illustrated is a nose portion PQ of the periphery of the eye piece for positioning the given camera, in accordance with an embodiment of the present disclosure. As shown, said nose portion PQ is depicted using dotted lines. Based on the test simulation, it was observed that when the given camera is arranged at any position within said nose portion PQ of the periphery of the eye piece for capturing eye images, a higher number of inliers are represented in the eye images. Thus, eye tracking accuracy would be significantly high. It was also observed that a remaining part of the portion AB has a high risk of obstructing a field of view of the given camera, for example, due to eye lashes and/or epicanthic folds of the user. In such a case, eye images would be inaccurately captured, and thus eye tracking accuracy would be adversely impacted. A minimum number of inliers for high eye-tracking accuracy is considered to be 4 or more. Based on the test simulation, it was observed that satisfactory (namely, accurate) camera positions lie in a range of 20 millimetres to 24 millimetres with respect to the vertex of the eye piece lens. It will be appreciated that these observations were later converted in terms of angles (in degrees), for sake of simplicity in an actual implementation of the aforementioned tracking system.

Figure 7:
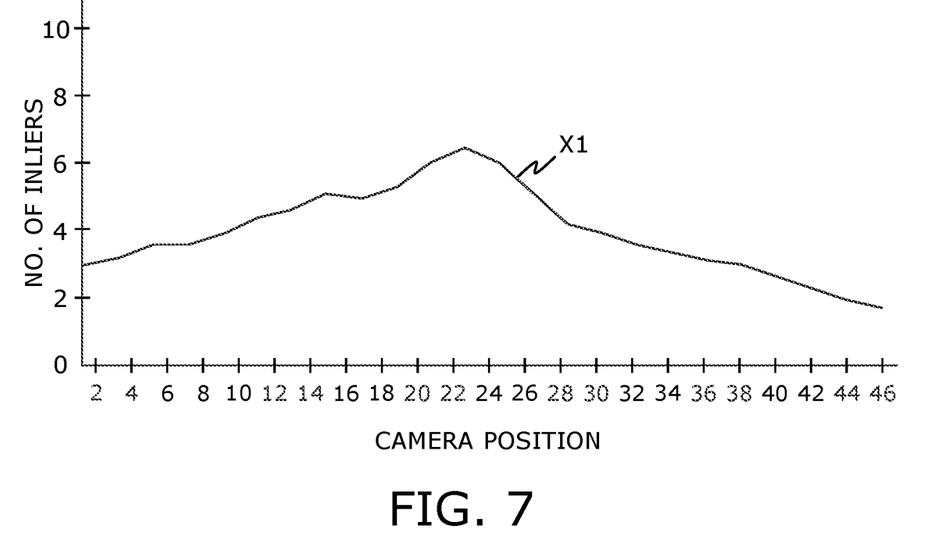
FIG. 7 illustrates a graphical representation of a variation of an average number of inliers as a function of a camera position, in accordance with an embodiment of the present disclosure.

Referring to FIG. 7, illustrated is a graphical representation of a variation of an average number of inliers as a function of a camera position, in accordance with an embodiment of the present disclosure. Herein, the variation of the average number of inliers is shown using a solid-line curve X1. From the curve X1 (generated upon the test simulation), it was observed that the average number of inliers are significantly higher for camera positions lying in a range of 14 millimetres to 30 millimetres with respect to a point A. These camera positions well-correspond to said nose portion PQ of the periphery of the eye piece for capturing eye images.

Figure 8A:
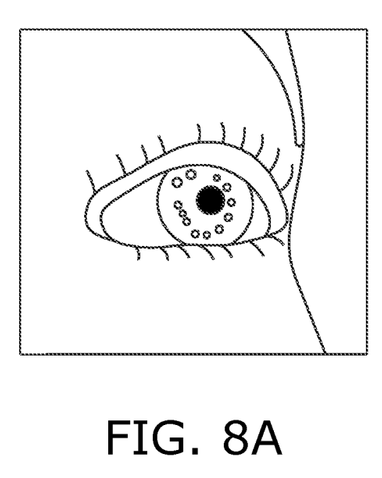
FIGS. 8A and 8B illustrate a comparison of an eye image captured by a given camera being arranged at any position within a nose portion of a periphery of an eye piece and an eye image captured by the given camera being arranged at a remaining portion of said periphery, in accordance with an embodiment of the present disclosure.
Figure 8B:
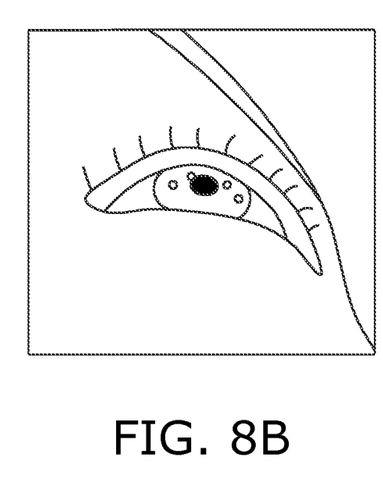

Referring to FIGS. 8A and 8B, illustrated is a schematic comparison of an eye image captured by the given camera being arranged at any position within said nose portion PQ of the periphery and another eye image captured by the given camera being arranged at a remaining portion of the periphery, in accordance with an embodiment of the present disclosure. With reference to FIG. 8A, the eye image appears to be well-captured, for example, in terms of accurately and clearly representing features of the user's eye, reflections of the plurality of illuminators (as inliers/glints), and the like. Thus, eye tracking accuracy would be considerably high when such an eye image is processed for tracking the user's eye as a higher number of inliers (for example, 12 inliers depicted as 12 small circles around a pupil of the user's eye) are visible in the eye image. On the other hand, with reference to FIG. 8B, the eye image appears to be distorted, i.e., not well-captured, and only 4 inliers are visible in the eye image.

Figure 9A:
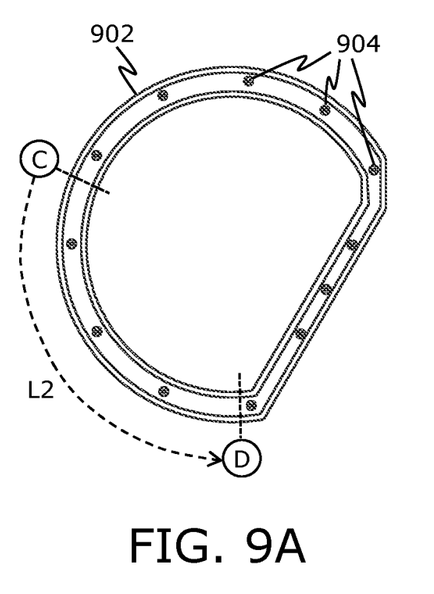
FIG. 9A illustrates an eye piece representing another portion of a periphery of the eye piece at which a given camera is arranged for performing a test simulation, in accordance with an embodiment of the present disclosure.

Referring to FIG. 9A, illustrated is the eye piece 902 representing another portion CD of a periphery of the eye piece 902 at which a given camera is arranged for performing a test simulation, in accordance with an embodiment of the present disclosure. The another portion CD of the periphery is horizontally opposite to the portion of the periphery that lies in a proximity of a user's nose when the display device is worn by the user. As shown, a plurality of illuminators 904 (depicted as 12 illuminators marked as crossed circles) are arranged along the periphery of the eye piece 902. For performing the simulation, a position of the given camera is gradually changed from C to D with a step size of 2 millimetres, and a number of inliers represented in a corresponding eye image are observed for different gaze directions of the user's eye.

Assuming a local coordinate system having origin (0, 0) at a vertex of an eye piece lens, a positional coordinate for C is (−30, 11) millimetres, and a positional coordinate for D is (−4, −30) millimetres. Moreover, a distance L2 between C and D is equal to 57.2 millimetres.

Figure 9B:
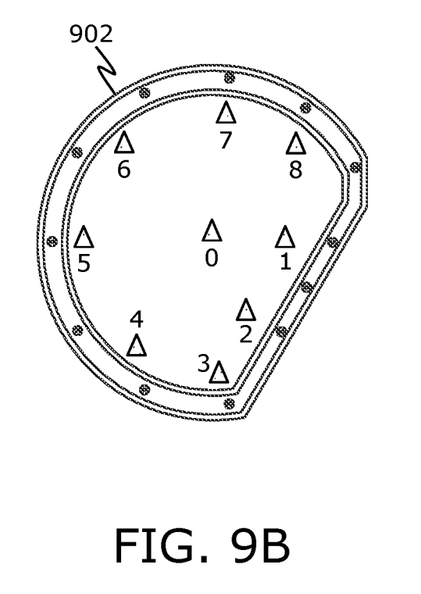
FIG. 9B illustrates different positions of areas/points on an imaginary plane through which different gaze directions of the user's eye pass, when a display device is worn by the user, in accordance with an embodiment of the present disclosure.

Referring to FIG. 9B, illustrated are different positions of areas/points on an imaginary plane (that is perpendicular to the horizon plane and on which the inter-optical horizon line lies) through which different gaze directions of the user's eye pass, when a display device is worn by the user, in accordance with an embodiment of the present disclosure. As shown, nine different positions of such areas/points are depicted using nine triangles marked from 0 to 8, wherein the nine different positions correspond to nine different gaze directions. For a given position of the given camera, eye images corresponding to the nine different gaze directions are analysed for determining the number of inliers represented in said eye images. Table 2 given hereinbelow represents the number of inliers for each position of the given camera and each gaze direction of the user's eye.

TABLE 2

| Gaze directions | | #0 | #1 | #2 | #3 | #4 | #5 | #6 | #7 | #8 | Average no. of inliers |
|---|---|---|---|---|---|---|---|---|---|---|---|
| Camera positions (mm) | 0 | 2 | 1 | 1 | 1 | 1 | 2 | 3 | 3 | 2 | 1.78 |
| | 2 | 2 | 1 | 1 | 1 | 1 | 2 | 3 | 3 | 2 | 1.78 |
| | 4 | 2 | 1 | 1 | 2 | 2 | 3 | 3 | 3 | 3 | 2.22 |
| | 6 | 2 | 2 | 2 | 2 | 2 | 3 | 3 | 3 | 3 | 2.44 |
| | 8 | 2 | 2 | 2 | 2 | 2 | 3 | 3 | 4 | 3 | 2.56 |
| | 10 | 3 | 2 | 2 | 2 | 3 | 4 | 4 | 4 | 3 | 3.00 |
| | 12 | 3 | 2 | 3 | 3 | 3 | 4 | 4 | 4 | 4 | 3.33 |
| | 14 | 4 | 2 | 3 | 3 | 3 | 4 | 4 | 4 | 4 | 344 |
| | 16 | 4 | 3 | 3 | 3 | 4 | 4 | 4 | 4 | 4 | 3.67 |
| | 18 | 5 | 3 | 3 | 4 | 4 | 4 | 4 | 4 | 4 | 3.89 |
| | 20 | 5 | 3 | 4 | 4 | 5 | 5 | 5 | 4 | 4 | 4.33 |
| | 22 | 5 | 4 | 4 | 4 | 5 | 5 | 5 | 4 | 5 | 4.56 |
| | 24 | 5 | 4 | 4 | 4 | 6 | 5 | 5 | 5 | 5 | 4.78 |
| | 26 | 5 | 3 | 4 | 5 | 5 | 5 | 5 | 4 | 4 | 4.44 |
| | 28 | 5 | 3 | 4 | 4 | 5 | 5 | 5 | 4 | 4 | 4.33 |
| | 30 | 4 | 3 | 3 | 4 | 5 | 4 | 4 | 4 | 4 | 3.89 |
| | 32 | 4 | 3 | 3 | 4 | 4 | 4 | 4 | 3 | 3 | 3.56 |
| | 34 | 4 | 2 | 3 | 3 | 3 | 4 | 3 | 2 | 3 | 3.00 |
| | 36 | 3 | 2 | 3 | 3 | 3 | 4 | 3 | 2 | 2 | 2.78 |
| | 38 | 3 | 2 | 3 | 2 | 3 | 4 | 3 | 1 | 2 | 2.56 |
| | 40 | 2 | 2 | 2 | 2 | 2 | 3 | 2 | 0 | 2 | 1.89 |
| | 42 | 2 | 2 | 2 | 2 | 2 | 3 | 2 | 0 | 1 | 1.78 |
| | 44 | 2 | 1 | 2 | 2 | 2 | 3 | 1 | 0 | 0 | 1.44 |
| | 46 | 2 | 1 | 2 | 2 | 2 | 2 | 1 | 0 | 0 | 1.22 |

Figure 9C:
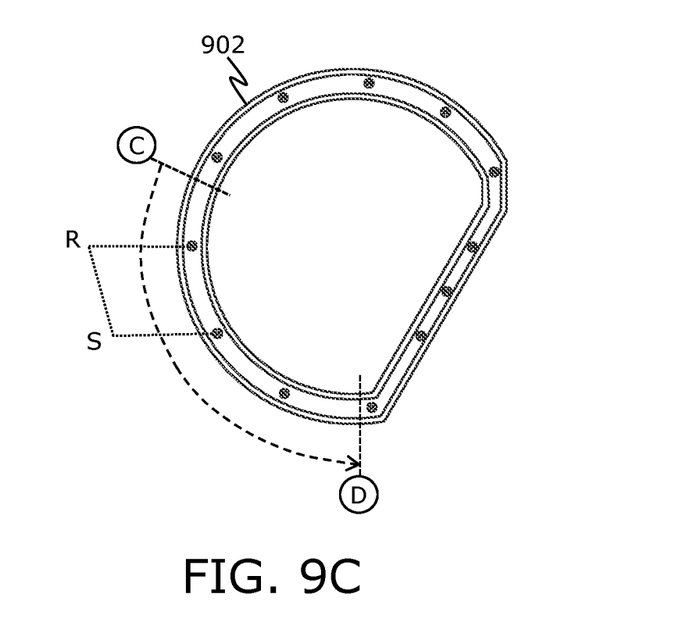
FIG. 9C illustrates a side portion of a periphery of an eye piece for positioning a given camera, in accordance with an embodiment of the present disclosure.

Referring to FIG. 9C, illustrated is a side portion RS of the periphery of the eye piece for positioning the given camera, in accordance with an embodiment of the present disclosure. The side portion RS is horizontally opposite to the nose portion PQ. As shown, the side portion RS is depicted using dotted lines. Based on the test simulation, it was observed that when the given camera is arranged at any position within the side portion RS of the periphery of the eye piece for capturing eye images, a higher number of inliers are represented in the eye images. Thus, eye tracking accuracy would be significantly high. It was also observed that a remaining part of the another portion CD has a high risk of obstructing a field of view of the given camera, for example, due to eyelashes and/or epicanthic folds of the user. In such a case, eye images would be inaccurately captured, and thus eye-tracking accuracy would be adversely impacted. A minimum number of inliers for high eye-tracking accuracy is considered to be 4 or more. Based on the test simulation, it was observed that satisfactory (namely, accurate) camera positions lie in a range of 18 millimetres to 28 millimetres with respect to the vertex of the eye piece lens. It will be appreciated that these observations were later converted in terms of angles (measured in degrees), for sake of simplicity in an actual implementation of the aforementioned tracking system.

It will be appreciated that it is evident from the tables "Table 1" and "Table 2" that implementing two cameras, one at the nose portion PQ and another at the side portion RS, fills each other's gaps in visibility of inliers. Moreover, dual camera setup introduces additional benefits as mentioned earlier.

Figure 10:
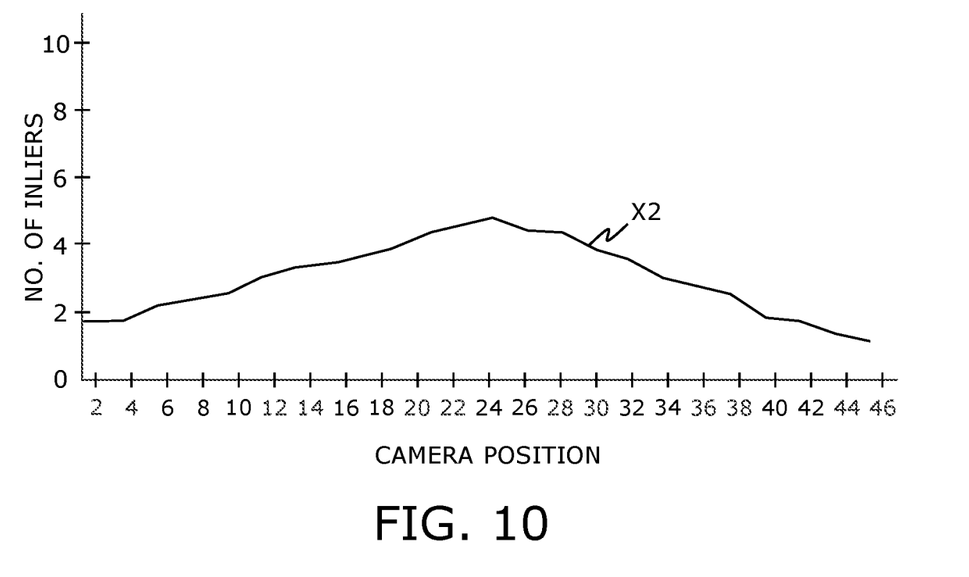
FIG. 10 illustrates another graphical representation of a variation of an average number of inliers as a function of a camera position, in accordance with an embodiment of the present disclosure.

Referring to FIG. 10, illustrated is another graphical representation of a variation of an average number of inliers as a function of a camera position, in accordance with an embodiment of the present disclosure. Herein, the variation of the average number of inliers is shown using a solid-line curve X2. From the curve X2 (generated upon the test simulation), it was observed that the average number of inliers are significantly higher for camera positions lying in a range of 18 millimetres to 30 millimetres with respect to a point C. These camera positions well-correspond to the side portion RS of the periphery of the eye piece for capturing eye images.

Figure 11A:
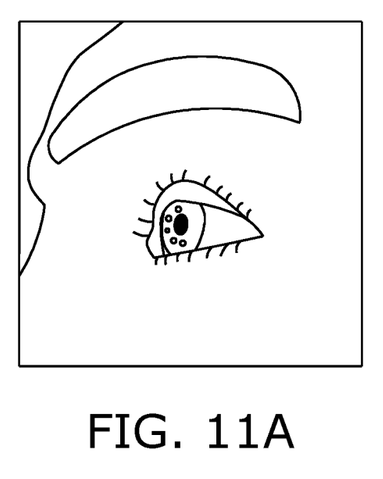
FIGS. 11A and 11B illustrate a comparison of an eye image captured by a given camera being arranged at any position within a side portion of a periphery of an eye piece and an eye image captured by the given camera being arranged at a remaining portion of said periphery, in accordance with an embodiment of the present disclosure.
Figure 11B:
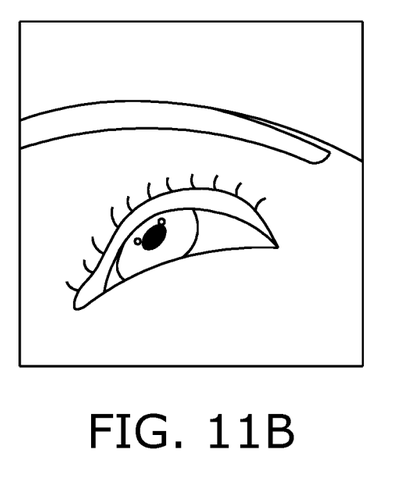

Referring to FIGS. 11A and 11B, illustrated is a schematic comparison of an eye image captured by the given camera being arranged at any position within the side portion RS of the periphery and an eye image captured by the given camera being arranged at a remaining part of the periphery, in accordance with an embodiment of the present disclosure. With reference to FIG. 11A, the eye image appears to be well-captured, for example, in terms of accurately and clearly representing features of the user's eye, reflections of the plurality of illuminators (as inliers/glints), and the like. Thus, eye tracking accuracy would be considerably high when such an eye image is processed for tracking the user's eye as a higher number of inliers (for example, 5 inliers depicted as 5 small circles around a pupil of the user's eye) are visible in the eye image. On the other hand, with reference to FIG. 11B, the eye image appears to be distorted i.e., not well-captured, and only 2 inliers are visible in the eye image.

What is claimed is:

1. A tracking system for use in a display device, the display device comprising an eye piece per eye, the tracking system comprising:

a plurality of illuminators per eye, arranged along a periphery of the eye piece; and a first camera per eye, arranged at the periphery of the eye piece, wherein a line passing through the first camera and an optical centre of the eye piece forms a first angle lying in a range of 0 degree to 40 degrees with respect to a horizon plane, wherein an optical axis of the eye piece and an inter-optical horizon line lie on the horizon plane, the inter-optical horizon line passing through optical centres of both eye pieces of the display device, the first camera being positioned below the horizon plane.

2. The tracking system of claim 1, wherein the first camera is arranged at a portion of the periphery of the eye piece that lies in a proximity of a user's nose when the display device is worn by the user, and wherein the first angle lies in a range of 20 degrees to 40 degrees with respect to the horizon plane.

3. The tracking system of claim 1, wherein the first camera is arranged at another portion of the periphery of the eye piece, the another portion lying horizontally opposite to a portion of the periphery that lies in a proximity of a user's nose when the display device is worn by the user, and wherein the first angle lies in a range of 0 degree to 30 degrees with respect to the horizon plane.

4. The tracking system of claim 1, wherein the first camera is arranged at a first portion of the periphery of the eye piece, the tracking system further comprising a second camera per eye, arranged at a second portion of the periphery of the eye piece, the second portion being horizontally opposite to the first portion.

5. The tracking system of claim 4, wherein a line connecting the second camera and the optical centre of the eye piece forms a second angle lying in a range of 0 degree to 40 degrees with respect to the horizon plane, the second camera being positioned below the horizon plane.

6. The tracking system of claim 4, further comprising at least one processor configured to:
control the plurality of illuminators to illuminate the user's eye;
control the first camera and the second camera to capture at least one first eye image and at least one second eye image of the user's eye, respectively, during illumination of the plurality of illuminators; and
process the at least one first eye image and the at least one second eye image, based on a pose of the first camera and a pose of the second camera, to generate a three-dimensional (3D) model of the user's eye.

7. The tracking system of claim 6, wherein the at least one processor is configured to utilise the 3D model of the user's eye to detect a gaze direction of the user's eye.

8. The tracking system of claim 1, further comprising at least one processor configured to:
control the plurality of illuminators to illuminate the user's eye; and
control the first camera to capture at least one first eye image of the user's eye, during illumination of the plurality of illuminators.

9. The tracking system of claim 8, wherein the at least one processor is configured to process the at least one first eye image to detect at least one of: a gaze direction of the user's eye, a facial expression of the user, a shape of the user's eyebrow, a shape of wrinkles on the user's skin, whether the user's eyelid is open or closed, whether the user has worn the display device.

10. A display device comprising a tracking system of claim 1.

11. The display device of claim 10, further comprising:
at least one light source that is to be employed to display images to a user; and
an eye piece lens through which light emanating from the at least one light source exits, wherein the periphery of the eye piece surrounds the eye piece lens.

* * * * *